US008924157B2

(12) United States Patent
Sano et al.

(10) Patent No.: US 8,924,157 B2
(45) Date of Patent: Dec. 30, 2014

(54) NAVIGATION DEVICE

(75) Inventors: Yoko Sano, Tokyo (JP); Tsuyoshi Sempuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/984,495

(22) PCT Filed: Jul. 5, 2011

(86) PCT No.: PCT/JP2011/003828
§ 371 (c)(1),
(2), (4) Date: Aug. 8, 2013

(87) PCT Pub. No.: WO2013/005249
PCT Pub. Date: Jan. 10, 2013

(65) Prior Publication Data
US 2013/0317745 A1 Nov. 28, 2013

(51) Int. Cl.
*G01C 21/34* (2006.01)
*G01C 21/36* (2006.01)
*G09B 29/00* (2006.01)
*G09B 29/10* (2006.01)

(52) U.S. Cl.
CPC .......... *G01C 21/3682* (2013.01); *G09B 29/007* (2013.01); *G09B 29/10* (2013.01)
USPC ........ 701/533; 701/432; 340/995.19

(58) Field of Classification Search
USPC ......... 701/400, 425–6, 428–432, 25–28, 500, 701/533; 340/988, 995.1–995.19
See application file for complete search history.

(56) References Cited

U.S. PATENT DOCUMENTS

| 6,427,118 | B1 | 7/2002 | Suzuki |
| 6,983,203 | B1 * | 1/2006 | Wako ............................. 701/533 |
| 2004/0260466 | A1 * | 12/2004 | Ichihara et al. ............... 701/209 |
| 2005/0273252 | A1 * | 12/2005 | Nix et al. ....................... 701/201 |
| 2007/0156187 | A1 * | 7/2007 | Ricci et al. ......................... 607/2 |
| 2008/0082262 | A1 * | 4/2008 | Silva et al. ..................... 701/211 |
| 2009/0144660 | A1 * | 6/2009 | Wako ............................. 715/835 |
| 2010/0077359 | A1 | 3/2010 | Shinawaki |
| 2010/0318573 | A1 * | 12/2010 | Yoshikoshi ................... 707/802 |
| 2013/0268892 | A1 * | 10/2013 | Schaaf et al. ................. 715/830 |

FOREIGN PATENT DOCUMENTS

| JP | 10-153449 A | 6/1998 |
| JP | 2001-116565 A | 4/2001 |
| JP | 2002-328031 A | 11/2002 |
| JP | 2004-144721 A | 5/2004 |

(Continued)

*Primary Examiner* — Yonel Beaulieu
(74) *Attorney, Agent, or Firm* — Birch, Stewart, Kolasch & Birch, LLP

(57) ABSTRACT

A navigation device includes a map creation unit, a display unit, and a display controller. The display unit displays, on a map created by the map creation unit, roadside target facility symbols representing facilities as navigation targets that are located along the navigation route, on-map facility symbols representing facilities that differ from the facilities as the navigation targets on the created map, and facility display switching buttons for receiving operation of switching display/non-display of the on-map facility symbols by facility category. The display controller switches the display/non-display of the on-map facility symbols in accordance with the operation received through the facility display button, and, when the received operation indicates the display of the on-map facility symbols, control the display unit to display the on-map facility symbols in a different display mode from a display mode of the roadside target facility symbols.

10 Claims, 8 Drawing Sheets

(56) References Cited

FOREIGN PATENT DOCUMENTS

| | | |
|---|---|---|
| JP | 2004-245581 A | 9/2004 |
| JP | 2005-37141 A | 2/2005 |
| JP | 2005-214783 A | 8/2005 |
| JP | 2006-309250 A | 11/2006 |
| JP | 2006-313088 A | 11/2006 |
| JP | 2007-17269 A | 1/2007 |
| JP | 2008-8839 A | 1/2008 |
| JP | 2008-232900 A | 10/2008 |
| WO | WO 2008/075492 A1 | 6/2008 |

* cited by examiner

NAVIGATION DEVICE

TECHNICAL FIELD

This invention relates to a navigation device for displaying a symbol representing the presence of a facility on a map.

BACKGROUND ART

In the first place, several terms used in this description will be defined.

The term "facility" means a building or a structure, including commercial facilities such as convenience stores (hereafter, abbreviated as CVS), public facilities such as schools, tourist facilities such as zoos, and road structures such as interchanges, the building or the structure being represented as a landmark or a denotation of a point on a map. This term "facility" may be used interchangeably with the term "POI" (Point Of Interest).

The term "nearby facility" means a facility that is located in an area off an intended route (i.e., in the periphery), or a facility that does not face the intended route. A facility that is located along the intended route shall be referred to as a "roadside facility."

The term "facility category" means a class for classifying facilities by their types. For example, facility categories of a commercial facility include CVS, bank, family restaurant, clothing store and the like.

The term "symbol" means an icon that represents a map element, such as a facility, on a map.

A technique is known, which provides a navigation device that switches map views to reduce unnecessary symbols based on the user operation among facility symbols to be superimposed on a map.

Patent Literature 1 discloses such a technique. In a navigation device according to Patent Literature 1, ON/OFF display switching of facility symbols and facility categories to be constantly displayed are registered in advance by the user operation. When a map indicating a route guiding to a desired destination is to be displayed, all the facility symbols having display coordinates within the display area of the map are displayed, if the display switching is set to OFF. In contrast, if the display switching is set to ON, all the facility symbols having display coordinates in a detailed display area set around the current position are displayed within the display area, whereas symbols of the facilities belonging to the categories for which the user has set constant display are displayed in the outside of the area.

In a navigation device according to Patent Literature 2, for example, a button for switching facility symbols is displayed on a map so that the facility symbols are switched between the following three methods every time this button is selected by the user. When the switching button is pressed for the first time, all types of the facility symbols are not displayed. When the switching button is pressed for the next time, only one type of the facility symbols A (e.g. a facility symbol of parking area) is displayed.

When the switching button is pressed again then, only another type of facility symbol B other than the facility symbol A that is already displayed (e.g. a facility symbol of CVS) is displayed. In this regard, it can be preliminarily set for each of the facility categories whether or not the facility symbols are displayed, so that every time the switching button is pressed by the user, facility symbols of the facility categories set preliminarily are displayed successively one by one, for example, in the order of the facility symbols B, C, D, . . . Alternatively, the preliminarily set facility categories can be displayed sequentially one by one, except the facility symbols of the categories which are not located in the display area on the map.

CITATION LIST

Patent Literature

PTL 1: Japanese Patent Application Publication No. 2005-214783
PTL 2: Japanese Patent Application Publication No. 2007-17269

SUMMARY OF INVENTION

Technical Problem

In Patent Literature 1, there is no distinction between a roadside facility symbol and a nearby facility symbol in displaying these symbols. Therefore, when these facility symbols are simply superimposed and displayed on a map, roadside facility symbols tend to become less visible, whereby the roadside facility symbols cannot be used effectively as objects of interest. Thus, the conventional techniques have a problem that no consideration is given to visibility of the roadside facility symbols on the map.

Further, since it is necessary to preset whether to display the facility symbols, in the case where nearby facility symbols are set to be displayed, the entire map on the screen may be overcrowded with displayed facility symbols in an area where a plenty of roadside facilities exist while the vehicle is traveling. In such circumstances, the user may wish to temporarily switch over from the display mode to the non-display mode of the nearby facility symbols in order to relieve the congestion of the displayed symbols and then switch back to the display mode after the congestion has been relived. However, the user cannot easily switch to the non-display mode since it is necessary for the user to go to the setting screen and perform some operations. Further, in the case where nearby facility symbols are preset not to be displayed, very few facility symbols may be displayed on the map screen in an area where few roadside facilities exist while the vehicle is traveling. In such circumstances, similarly, the user cannot easily switch to the display mode of nearby facility symbols even if the user wishes to temporarily switch over from the non-display mode to the display mode of the nearby facility symbols to check whether there are nearby facilities and then switch back to the non-display mode.

Patent Literature 2 proposes a technique in which a switching button is displayed on a map to facilitate the user to switch the display facility categories sequentially one by one. However, this technique is the same as that of Patent Literature 1 in that no distinction is made between the roadside facility symbols and the nearby facility symbols. In addition, no distinction is set in priorities between the facility symbols that are located along the route and those that are located in the periphery. Therefore, no consideration is given to visibility of the roadside facility symbols, thereby the roadside facility symbols were not used effectively as an object of interest (landmark along the navigation route).

This invention has been made in order to overcome the drawbacks above, and an object of the invention is to provide a map with high visibility which is able to easily switch the display of facility symbols between display and non-display, and to make facility symbols located along the route road more visible even when nearby facility symbols are displayed.

Solution to Problem

A navigation device according to an aspect of an embodiment of this invention comprises: a map creation unit configured to create a map to be displayed based on map data containing position information of roads, position information of facilities and categories of the facilities, and based on information on a navigation route to a destination; a display unit configured to display, on the created map, roadside target facility symbols representing facilities as navigation targets that are located along the navigation route, on-map facility symbols representing facilities that differ from the facilities as the navigation targets on the created map, and facility display switching buttons for receiving operation of switching display/non-display of the on-map facility symbols by facility category; and a map element display controller configured to switch the display/non-display of the on-map facility symbols in accordance with the operation received through the facility display button, and, when the received operation indicates the display of the on-map facility symbols, control the display unit to display the on-map facility symbols in a different display mode from a display mode of the roadside target facility symbols; a GUI controller for generating a facility display switching button for switching display/non-display of on-map facility symbols representing facilities that are located near the navigation route for each facility category; a display unit comprising a screen and configured to superimpose the roadside target facility symbols arranged by the map element display controller and the facility display switching buttons generated by the GUI controller over the map created by the map creation unit and display the superimposed map on the screen; an input unit including a touch panel integrated with the screen of the display unit and configured to receive a user operation on the facility display switching buttons on the map displayed by the display unit; a display mode determination unit for determining, based on information indicating facility categories contained in the map data, a display mode for the facility symbols of the facility category corresponding to the facility display switching button on which the user operation is received by the input unit, the display mode for the facility symbols being different from a display mode for the roadside target facility symbols; and a display controller for superimposing, when displaying, on the basis of switching display/non-display, the on-map facility symbols of the facility category corresponding to the facility display switching button on which the user operation is received by the input unit, the facility symbols of the facility category concerned in the display mode determined by the display mode determination unit on the map created by the map creation unit.

Advantageous Effects of Invention

According to an aspect of an embodiment of this invention, a button for switching the display of nearby facility symbols are arranged on a map. Therefore, operability is improved. Further, since nearby facility symbols displayed in response to the user operation and roadside facility symbols serving as object of interests along a navigation route are displayed differently, an object of interests along the route stands out and a map with high visibility may be provided.

DESCRIPTION OF EMBODIMENTS

In order to describe this invention in more detail, exemplary embodiments for carrying out the invention will be described with reference to the accompanying drawings.
Embodiment 1

Figure 1:
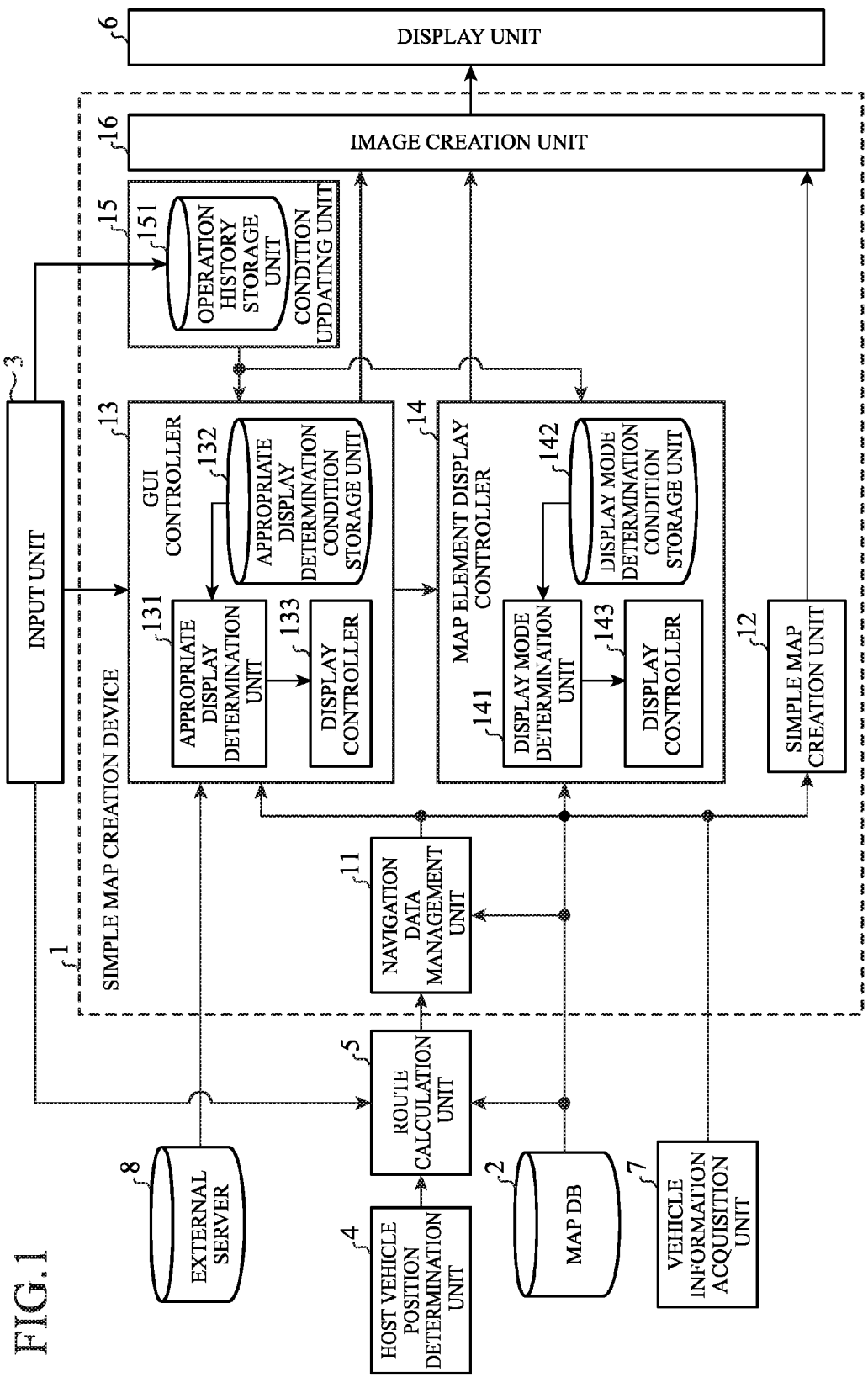
FIG. 1 is a block diagram showing a configuration of a navigation device according to embodiment 1 of this invention.

The navigation device shown in FIG. 1 comprises a simple map creation device 1 for creating a simple map, a map database for storing map data (hereafter, abbreviated as DB) 2, an input unit 3 that is configured with a touch panel integrated with a display and receives user inputs, a host vehicle position determination unit (position determination unit) 4 for receiving GPS (Global Positioning System) signals and determining a current position of the host vehicle, a route calculation unit 5 for searching for a route to a destination, a display unit 6 that is configured with the display and displays the simple map created by the simple map creation device 1, and a vehicle information acquisition unit 7 for acquiring vehicle speed information or the like detected by a vehicle speed sensor from the vehicle side. Further, the navigation device is configured to communicate with an external server 8 outside the car through communications and acquire information therefrom.

The term "simple map" as used herein refers to a map in which target facilities located along the route are extracted, and facility symbols indicating those target facilities are displayed such that they do not overlap the route and do not overlap each other.

Map data stored in the map DB 2 includes a map image, and information on, for example, roads and facilities (so-called POIs) located in this map image. This road information includes position information on nodes, such as a start point and an end point, and a line connecting these nodes (road link). Each link is associated with a cost (link cost) that is required for the vehicle to travel along the road link concerned. The facility information includes, for example, information on positions of facilities and information on categories representing types of facilities, and each piece of facility information is associated with data of an icon (facility symbol) to display the facility on the map.

Note that the navigation device need not be provided with the map DB 2 locally; the navigation device may acquire map data from a remote map DB outside the car through communications.

The route calculation unit 5 acquires a destination that is inputted by the user and received through the input unit 3, acquires a current position from the host vehicle position determination unit 4, and then retrieves map data containing the start point (current position) and the destination from the map DB 2. Subsequently, the route calculation unit 5 uses road information contained in the retrieved map data to execute a predetermined route calculation algorithm. When a route with a shorter distance is to be searched for in preference, for example, a value according to the length of the road link (that is, the road distance) is assigned to each link cost, so that a route with a minimum link cost to connect from the start point to the destination is calculated and defined as a navigation route. Road information such as position information on road links constituting the navigation route and information assigned to the road links (e.g., road name) is output to a navigation data management unit 11.

The simple map creation device 1 comprises a simple map creation unit (map creation unit) 12, a navigation data management unit 11, a graphical user interface (hereafter, abbreviated as GUI) controller 13, a map element display controller 14, a condition updating unit 15, and an image creation unit 16.

The navigation data management unit 11 acquires road information on the navigation route from the route calculation unit 5, and outputs the acquired information, if necessary, to the simple map creation unit 12, the GUI controller 13 and the map element display controller 14. More specifically, the navigation data management unit 11 manages and holds the navigation route road information (position information such as nodes and links, and road names), information on intersections to pass through (coordinates of the intersections, whether or not the relevant intersection is to be guided, names of the intersections, whether or not traffic lights are provided), in the sequence of positions in which the host vehicle travels on the navigation route from the current position thereof, and outputs these items of information if necessary.

The simple map creation unit 12 creates display information for causing the ground form (green space, water systems, etc.) and roads of the elements forming the simple map to be displayed on the screen, and outputs the display information to the image creation unit 16. As for roads, the simple map creation unit 12 retrieves from the map DB 2 map data covering the navigation route and the surrounding area within a predetermined range of the navigation route based on the road information received from the navigation data management unit 11, and sets the roads in such a manner that the roads corresponding to the navigation route can be distinguished from the other roads.

Based on the road information received from the navigation data management unit 11, the GUI controller 13 acquires, from the map DB 2, facility information contained in map data covering the navigation route and the surrounding area within a predetermined range of the navigation route. The GUI controller 13 then uses the acquired facility information to create display information on a nearby facility display switching button for switching between display and non-display of facility symbols on the simple map, and outputs the display information to the image creation unit 16. The GUI controller 13 will be described in more detail in accordance with Embodiment 2 below.

Based on the road information received from the navigation data management unit 11, the map element display controller 14 extracts information on facilities as object of interests that are located along the navigation route from the facility information contained in map data covering the navigation route and the surrounding area within a predetermined range of the navigation route, and displays symbols associated with the extracted facility information such that they do not overlap the route and do not overlap each other. Each of these symbols shall be referred to as a roadside facility symbol. The map element display controller 14 then outputs display information of roadside facility symbols to the image creation unit 16. The display information includes, for example, image data and positional information, which are necessary to display roadside facility symbols on the simple map.

The map element display controller 14 may determine whether or not a facility is a roadside facility by using both facility position information and navigation route position information. For example, the map element display controller 14 may determine that a facility is a roadside facility when it is located within a predetermined range from the navigation route, and that a nearby facility when outside the predetermined range.

The map element display controller 14 is not always required to display all the facilities determined as roadside facilities on the simple map in the form of roadside facility symbol. For example, when identification information is preset in the facility information to distinguish whether or not each roadside facility is used as an object of interest, only the roadside facilities for which this identification information is set may be displayed in the form of the roadside facility symbol.

When acquiring, via the GUI controller 13, pressing (touching) a nearby facility display switching button received by the input unit 3 through the user operation, the map element display controller 14 extracts from the map DB 2 facility information corresponding to the pressed (touched) nearby facility display switching button. The display mode determination unit 141 then determines facility symbols to be displayed on the simple map based on display mode determination conditions stored in the display mode determination condition storage unit 142, and further determines a display mode for each displayed facility symbol, such as size, position, and order of superimposition. The display mode determination condition storage unit 142 stores information that serves as conditions for determining facility symbols to be displayed and for determining a display mode (e.g., priorities of facility categories, and region to determine superimposition). According to a determination result of the display mode determination unit 141, the display controller 143 outputs display information on nearby facility symbols to the image creation unit 16.

Figure 2:
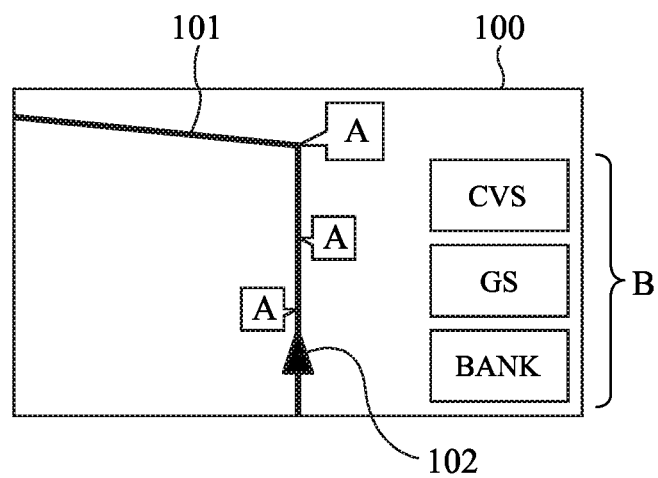
FIG. 2 is a diagram showing an example of a display screen of the navigation device according to embodiment 1.

FIG. 2 shows an example of a display screen of the navigation device. There are displayed, on a simple map 100, a navigation route 101 and a host vehicle position 102. There are further displayed three roadside facility symbols A such that they do not overlap the navigation route 101. There are further displayed, on this simple map 100, three types of nearby facility display switching buttons B, in the order of CVS, gas station (hereafter, abbreviated as GS), and bank top to bottom. For example, the nearby facility display switching button B for "CVS" is a button for switching display and non-display of the facility symbols that belong to the facility category of "CVS". When this button is pressed (touched), nearby facility symbols representing CVS will be displayed on the map.

Figure 3:
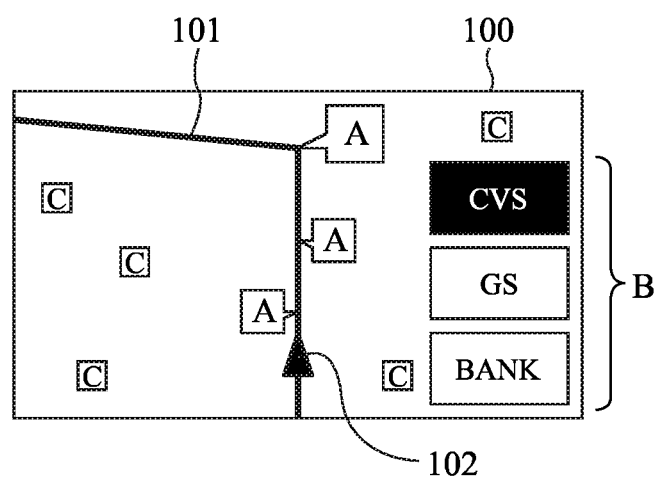
FIG. 3 is a diagram showing an example of a display screen of the navigation device according to embodiment 1, in which nearby facility symbols are displayed.

FIG. 3 shows an example of a display screen on which nearby facility symbols C for CVS are displayed. When the switching button B for CVS is pressed again, these nearby facility symbols for CVS are hidden.

Facility categories, displayed positions, the number of displayed images to be displayed as nearby facility display switching buttons B are determined by the GUI controller 13. In response to pressing (touching) one of these nearby facility display switching buttons B, the control to switch display and non-display of nearby facility symbols corresponding to the pressed (touched) button is performed by the map element display controller 14.

The condition updating unit 15 comprises an operation history storage unit 151 for storing user operation history received by the input unit 3 as history information. This condition updating unit 15 updates appropriate display determination conditions for the GUI controller 13 determining facility categories, displaying positions and the number of images to be displayed as the nearby facility display switching buttons B, based on the history information in the operation history storage unit 151.

The condition updating unit 15 also updates display mode determination conditions for determining a corresponding nearby facility symbol in response to pressing (touching) the nearby facility display switching button B and determining a display mode for displaying the nearby facility symbol, based on the history information in the operation history storage unit 151.

According to the display information received from the GUI controller 13, the image creation unit 16 superimposes nearby facility display switching buttons on a map based on the display information received from the simple map creation unit 12. Further, according to the display information received from the map element display controller 14, the image creation unit 16 creates image data of a simple map on which map elements such as roadside facility symbols and nearby facility symbols are superimposed. The image creation unit 16 then outputs the created image data to the display unit 6.

Next, an operation of the map element display controller 14 will be described with reference to the flowchart shown in FIG. 4. Here, it is assumed that, as shown in the display screen with reference to FIG. 2, there are displayed on the simple map 100 for navigating the navigation route 101 the nearby facility display switching buttons B for switching displays of nearby facility symbols that are located in the display area. It is also assumed that the map element display controller 14 has already acquired from the map DB 2 facility information on all facilities that are located within the display area regardless of whether a facility is located along or around the navigation route.

When the user presses (touches) the nearby facility display switching button B for the facility category of "CVS" displayed on the touch display of the display unit 6, the input unit 3 receives the pressing (touching) the button and outputs it to the GUI controller 13. The GUI controller 13 then outputs information indicating that the nearby facility display switching button for CVS has been pressed to the map element display controller 14.

In step ST1 if the map element display controller 14 receives from the GUI controller 13 the information indicating that the nearby facility display switching button for the facility category of "CVS" has been pressed ("YES" in step ST1), in the subsequent step ST2, the display mode determination unit 141 selects a facility symbol with which "CVS" is associated as the category information out of the facility symbols that are already extracted from the map DB 2. The display mode determination unit 141 then determines whether or not the selected facility symbol (subject facility symbol) is already displayed on the simple map 100 as an object of interest (i.e., as a roadside facility symbol) according to one of the display mode determination conditions stored in the display mode determination condition storage unit 142.

Note that the display mode determination conditions stored in the display mode determination condition storage unit 142 are branch conditions pertaining to the steps of ST2 to ST10.

If the subject facility symbol is already displayed as a roadside facility symbol ("YES" in step ST2), processing skips to step ST12 without performing any further processing for this facility symbol. Further, in step ST12, if there is another facility symbol with which "CVS" is associated as the category information, the display mode determination unit 141 returns its process to step ST2. If there is no other facility symbol with which "CVS" is associated as the category information ("YES" in step ST12), a series of processing steps are terminated.

In contrast, if the subject facility symbol is not displayed as a roadside facility symbol yet ("NO" in step ST2), the display mode determination unit 141 subsequently determines whether or not the subject facility symbol overlaps the navigation route according to one of the display mode determination conditions (step ST3).

If it is determined that the subject facility symbol overlaps the navigation route ("YES" in step ST4), the display mode determination unit 141 determines this facility symbol not to be displayed (step ST11). This is for the purpose of avoiding impairment of simplicity of the map and visibility of the navigation route.

In contrast, if it is determined that the subject facility symbol does not overlap the navigation route ("NO" in step ST4), the display mode determination unit 141 subsequently determines, according to one of the display mode determination conditions, whether or not the subject facility symbol overlaps an already displayed facility symbol (a roadside facility symbol and/or a nearby facility symbol) (step ST5). The determination of whether or not the subject facility symbol overlaps an already displayed facility symbol is carried out by determining whether or not the display area of the subject facility symbol at least partially covers the display area of a roadside facility symbol that is already displayed or a nearby facility symbol that is determined to be displayed in step ST10 to be described later.

If it is determined that the subject facility symbol does not overlap an already displayed facility symbol ("NO" in step ST6), the display mode determination unit 141 then determines this subject facility symbol to be displayed (step ST10).

In contrast, if it is determined that the subject facility symbol overlaps an already displayed facility symbol ("YES" in step ST6), the display mode determination unit 141 subsequently determines whether or not a roadside facility symbol is included in the already displayed facility symbols the subject facility symbol overlaps (step ST7). If it is determined that a roadside facility symbol is included in the already displayed facility symbols the subject facility symbol overlaps ("YES" in step ST7), the display mode determination unit 141 determines that the subject facility symbol is not to be displayed (step ST11). This is for the purpose of avoiding impairment of simplicity of the map and visibility of the navigation route.

In contrast, if it is determined that no roadside facility symbol is included in the already displayed facility symbols the subject facility symbol overlaps ("NO" in step ST7), the display mode determination unit 141 compares the priority of the subject facility symbol with that of the already displayed facility symbol(s) the subject facility symbol overlaps (step ST8). A priority of each facility symbol may be predetermined and given to, for example, the display mode determination condition storage unit 142. Priorities may be predetermined according to a category of a nearby facility symbol (in this example, the highest priority is given to CVS, and lower priorities are given to GS and banks in a descending order). Priorities within the same category may be set according to brands.

For example, if it is determined in step ST6 that the subject facility symbol (CVS) overlaps a nearby facility symbol representing a GS or a bank, since the priority of the subject facility symbol is higher than that of the GS or the bank in comparing priorities in step ST8 ("YES" in step ST9), it is determined that the subject facility symbol (CVS) is to be displayed (step ST10). If the subject facility symbol represents a GS and a symbol to be overlapped is a nearby facility symbol representing a CVS, since the priority of the subject facility symbol is lower than that of the CVS in comparing priorities in step ST8 ("NO" in step ST9), the facility symbol (GS) is determined not to be displayed (step ST11).

If it is determined that the subject facility symbol is to be displayed in step ST10, the display mode determination unit 141 notifies the display controller 143 of the subject facility symbol. The display controller 143 changes the subject facility symbol thus notified into a display mode suitable for representation as a nearby facility symbol on the simple map 100, and outputs the same to the image creation unit 16. The display mode is such that the display size of the nearby facility symbol is made smaller than that of a roadside facility symbol so that the user can distinguish the roadside facility symbols from the nearby facility symbols, and that the roadside facility symbols are more prominent than the nearby facility symbols. These sizes may be predetermined and given to the display controller 143. The display controller 143 outputs, to the image creation unit 16, display information of the nearby facility symbols such as image data, display sizes, and display positions, and the image creation unit 16 uses the display information to superimpose and display the nearby facility symbols on the simple map 100.

In the subsequent step ST12, if it is determined that the aforementioned processing for all the facility symbols with which "CVS" is associated as the category information is completed ("YES" in step ST12), the display mode determination unit 141 terminates the series of processing steps. As a result, as shown in FIG. 3, four nearby facility symbols C each indicating a CVS are displayed on the simple map 100 on which the navigation route 101 and three roadside facility symbols A are displayed. According to FIG. 3, no nearby facility symbols C overlapping the navigation route 101 are displayed, so that the navigation route 101 can be displayed more visibly. Further, since the nearby facility symbols C are displayed in a smaller size than the roadside facility symbols A, it is possible to more visibly display roadside facility symbols A that may serve as landmark on the navigation route 101.

Figure 4:
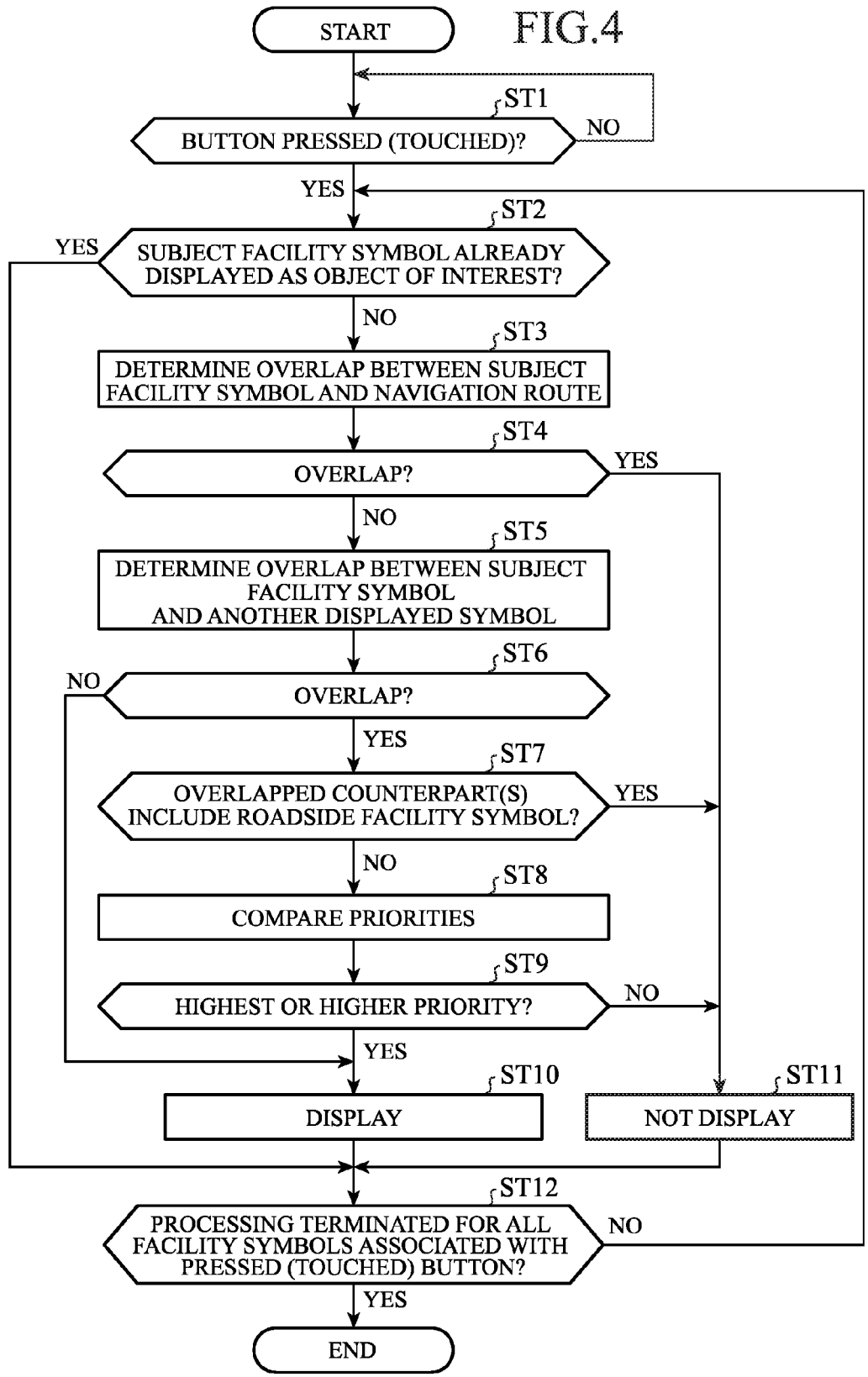
FIG. 4 is a flowchart illustrating operation of a map element display controller of the navigation device according to embodiment 1.

The processing shown in the FIG. 4 is performed for each facility symbol belonging to the facility category corresponding to the button pressed (touched) every time the image creation unit 16 updates images to draw.

If the nearby facility display switching buttons B for "CVS" is pressed (touched) again in the display screen as shown in FIG. 3, the map element display controller 14 stops outputting the display information of the nearby facility symbols C to cause the symbols C for CVS not to be displayed.

If the nearby facility display switching button B for "GS" is pressed (touched) in the display screen shown in FIG. 3, the map element display controller 14 performs the processing shown in the flowchart of FIG. 4. This causes the nearby facility symbols D for GS to be displayed on the simple map 100 as shown in the example of the display screen shown in FIG. 5.

In the description above is made in accordance with the case where the display size of nearby facility symbols is simply set smaller than that of the roadside facility symbols when the display controller 143 determines a display mode of the nearby facility symbols in step ST10. However, the facility symbols may be displayed in other display modes. For example, roadside facility symbols and nearby facility symbols may be distinguished in terms of saturation, shading (with shade/without shade), or transparency. Thereby, it is also possible to display the roadside facility symbols more prominent than the nearby facility symbols.

Figure 5:
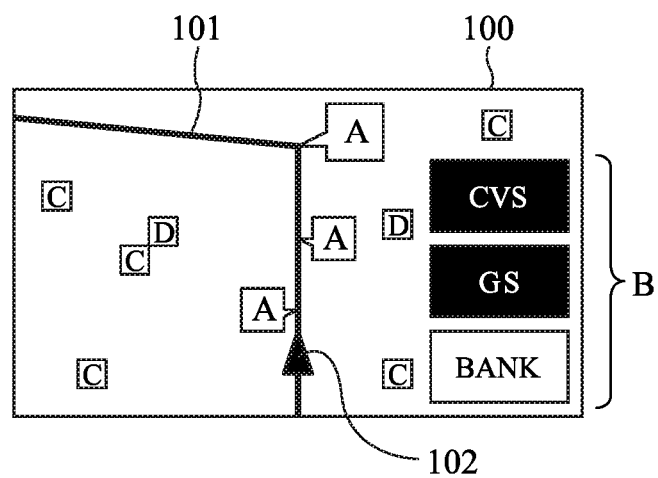
FIG. 5 is a diagram showing an example of a display screen of the navigation device according to embodiment 1, in which two types of nearby facility symbols are displayed.

Although in the examples shown in FIGS. 3 and 5 the roadside facility symbols A are depicted in a balloon to arrange them a bit away from the navigation route 101, the positions of the nearby facility symbols C and D are not depicted in such a fashion; symbols C and D are neither shifted nor enclosed in a balloon. Whether or not the nearby facility symbols are depicted in a balloon does not affect the visibility of the navigation route 101, but the nearby facility symbols are not shifted or depicted in a balloon in order to reduce the processing load in this example.

In the above, the description is made in accordance with the case where the display size of the nearby facility symbols may be predetermined and given to the display controller 143. Alternatively, the display size may be variable according to a degree of congestions of the facility symbols displayed on the simple map. The display size maybe made smaller as the displayed symbols get more crowded, whereby higher visibility can be ensured.

Although, in the description above, the display controller 143 is configured to display only the nearby facility symbols with the highest priority instep ST10, the facility symbols with a higher priority and the facility symbols with a lower priority may be concurrently displayed in an overlapped fashion with the facility symbols with a higher priority in front (upper) and that with a lower priority in rear (under). To be consistent with this configuration in which symbols are overlapped, the display mode determination unit 141 compares the priority of the subject facility symbol with that of a nearby facility symbol overlapping the subject facility symbol ("YES" in steps ST8 and ST9), and notifies the display controller 143 of these facility symbols and the order of overlapping these facility symbols according to their priorities. Upon receiving this notification, the display controller 143 displays the facility symbols overlapped in the sequence according to their priorities.

The configuration may also be such that the priority of the roadside facility symbols is set higher than that of the nearby facility symbols in the display mode determination condition storage unit 142, and the display mode determination unit 141 proceeds to the processing step ST8 without performing the processing of step ST7. The display mode determination unit 141 may determine that the priority of the subject facility symbol (that is, the nearby facility symbol) is lower than that of the roadside facility symbols ("NO" in steps ST8 and ST9), and that the subject facility symbol is not to be displayed (step ST11).

In this configuration as well, not only are the roadside facility symbols of higher priorities displayed, but the facility symbols with higher priorities may be displayed in front (upper) while those with lower priorities maybe displayed in rear (under). In this case, the roadside facility symbols are displayed in the foremost surface while the nearby facility symbols are displayed in the rear of (under) the roadside facility symbols in descending order of priority.

In the flowchart of FIG. 4, the display mode determination condition for differentiating display modes depending on whether a facility symbol is located along the navigation route or near the route is used. However, another condition may be used.

Figure 6:
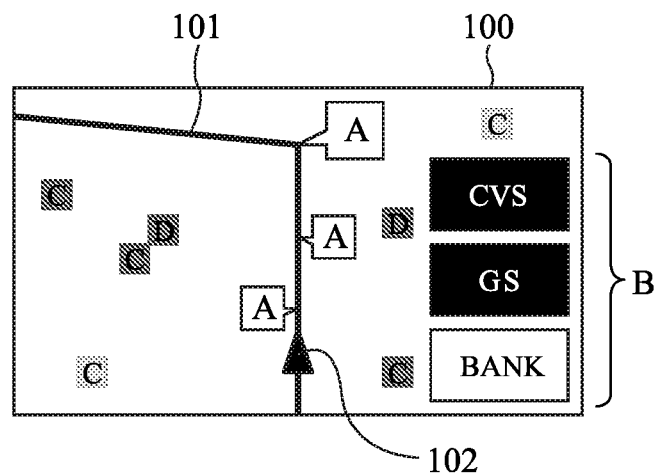
FIG. 6 is a diagram showing an example of a display screen of the navigation device according to embodiment 1.

For example, nearby facility symbols may be displayed to become less prominent as they get far or difficult to reach from the navigation route. FIG. 6 shows an example of a display screen for which a display mode is set such that a nearby facility symbol that is further away from the navigation route 101 is displayed in a less s prominent manner. In this case, the navigation data management unit 11 preliminarily calculates a distance from the navigation route to each of road links within the display area. Based on the calculated distances of road links close to the subject facility symbol, the display controller 143 increases the saturation of the subject facility symbol as the distance of the subject facility symbol to the navigation route becomes smaller and vice versa.

Alternatively, the navigation data management unit 11 may be configured to calculate the number of branches to each road link within the display area from the navigation route. The display controller 143 increases the saturation of the subject facility symbol that is located near the route with smaller number of branches as the number of branches in the route close to the subject facility symbol becomes smaller, and vice versa.

Alternatively, the navigation data management unit 11 may be configured to weight a link cost based on information on width pertaining to the road link, and to calculate a cost from the navigation route to each road link within the display area. That is, the link cost is decreased as the road width from a road link constituting the navigation route to a road link concerned becomes wider (easier to drive), whereas the link cost is increased as the road width becomes narrower (more difficult to drive). The display controller 143 may increase the saturation of a subject facility symbol located in positions with a smaller link cost and decrease that with a higher link cost.

Further, based on the vehicle speed information obtained from the vehicle information acquisition unit 7, the display controller 143 may display nearby facility symbols in a predetermined display mode while the vehicle is in halt (or traveling at less than a predetermined speed), and transparently display nearby facility symbols while the vehicle is traveling (or traveling at the predetermined speed or more). Thereby, visibility of the navigation route while travelling is ensured.

In the description with reference to the flowchart shown in FIG. 4, priorities of the facility symbols are preliminarily defined in the display mode determination condition storage unit 142. However, the priorities may be variable according to learning. For example, the operation history storage unit 151 may acquire the user operation history from the input unit 3 to store the number of times the nearby facility display switching button is pressed (touched), destinations, names of nearby facilities in searching nearby facilities, and the like. The condition updating unit 15 refers to the history information in the operation history storage unit 151 so that the priority of a facility category which the user has selected more times is increased. This makes it possible to display a nearby facility symbol which the user presses more frequently more preferentially when nearby facility symbols are displayed in an overlapped manner.

Not only the priority of facility categories, but also the priority of facilities in the same facility category may be made variable according to the history information.

The navigation device according to an aspect of embodiment 1 as described above is configured to include a map DB 2 storing map data containing position information of roads and facilities, a host vehicle position determination unit 4 for acquiring a host vehicle position, a route calculation unit 5 for calculating a navigation route from the host vehicle position to a destination, a navigation data management unit 11 for managing road information of the navigation route, a simple map creation unit 12 for creating a map to be displayed on a screen based on the map data stored in the map DB 2 and the navigation route information output by the navigation data management unit 11, a map element display controller 14 for arranging on the map created by the simple map creation unit 12 roadside facility symbols representing facilities located along the navigation route such that the roadside facility symbols do not overlap with the navigation route and with each other, a GUI controller 13 for creating a nearby facility display switching button for switching between display and non-display of nearby facility symbols representing facilities located in a nearby area of the navigation route for each facility category, a display unit 6 for displaying on the map created by the simple map creation unit 12 the roadside facility symbols arranged by the map element display controller 14 and the nearby facility display switching buttons created by the GUI controller 13, an input unit 3 including a touch panel integrated with the screen of the display unit 6 and configured to receive a user operation on the nearby facility display switching buttons on the map displayed by the display unit 6, a display mode determination unit 141 for determining based on information indicating the facility categories contained in the map data a display mode for nearby facility symbols of a facility category corresponding to a nearby facility display switching button the user operation on which is received by the input unit 3, such that the display mode thus determined is different from the display mode for the roadside facility symbols, and a display controller 143 for superimposing, when displaying, on the basis of switching display/non-display, the nearby facility symbols of the facility category corresponding to the nearby facility display switching button on which the user operation is received by the input unit 3, the nearby facility symbols of the facility category concerned in the display mode determined by the display mode determination unit 141 on the map created by the map creation unit 12. This configuration allows the user to easily switch between the display and non-display with use of the nearby facility display switching buttons arranged on the simple map and the operability can be improved. Also when the nearby facility symbols are displayed in response to the user operation, the user is allowed to view the roadside facility symbols easily and to recognize the objects of interest along the route easily.

Further, according to an aspect of embodiment 1, the display mode determination unit 141 is configured to display the roadside facility symbols and the nearby facility symbols in different sizes, which enables to make more prominent the roadside facility symbols displayed as the object of interest along the navigation route, and thus a map with high visibility are provided.

Further, according to one aspect of Embodiment 1, the map element display controller 14 includes a display mode determination condition storage unit 142 for storing information on priorities according to categories of the facilities, and when the displayed facility symbols are overlapped one another, the display mode determination unit 141 displays those facility symbols with higher priority preferentially based on the category information contained in the map data and indicating types of the facility symbols. This makes it possible to provide a map in which contents are displayed in an optimal state for the user.

Further, the priority of the roadside facility symbols may be set higher than that of the nearby facility symbols, so that the roadside facility symbols are prevented from being hidden by the nearby facility symbols when displayed on the screen.

The navigation device according to one aspect of Embodiment 1 comprises the condition updating unit 15 including the operation history storage unit 151 for storing information on history of the user operation, wherein the condition updating unit 15 updates priorities stored in the display mode determination condition storage unit 142 based on the history information in the operation history storage unit 151 such that the priority of a category of facilities for which the user operation has been done more frequently is made higher, and wherein the display mode determination unit 141 is configured to determine overlapping of the nearby facility symbols by using information on priorities updated by the condition updating unit 15. This makes it possible to provide a map in which contents are displayed in an optimal state for the user.

Embodiment 2

A navigation device according to Embodiment 2, which comprises a similar configuration to that of the navigation device shown in FIG. 1 as long as viewed in FIG. 1, will be described with aid of FIG. 1.

The description of Embodiment 2 will be made with a focus on the GUI controller 13 for displaying nearby facility display switching buttons on a simple map. This GUI controller 13 retrieves from the map DB 2 facility information contained in the map data for predetermined display area including the navigation route according to road information input from the navigation data management unit 11. Based on appropriate display determination conditions stored in an appropriate display determination condition storage unit 132, an appropriate display determination unit 131 then determines facility categories to be assigned to nearby facility display switching buttons, the number of buttons to be displayed, an alignment order of the buttons to be displayed, and the like. In the appropriate display determination condition storage unit 132, there are stored information serving as conditions for displaying the buttons appropriately (priorities of facility categories, user-set information, criteria for determining density of symbols on a display screen, and the like). According to a determination result by the appropriate display determination unit 131, the display controller 133 outputs GUI display information such as nearby facility display switching buttons to the image creation unit 16.

Operation of the GUI controller 13 will be described with reference to the flowchart shown in FIG. 7.

The appropriate display determination unit 131 receives through the navigation data management unit 11 a notification issued by the route calculation unit 5 at the time when a navigation route is set, and retrieves user set information stored in the appropriate display determination condition storage unit 132 in step ST21. This user set information is information that is set by the user through the input unit 3 in advance, and concerns the number of nearby facility display switching buttons to be displayed on the simple map and facility categories to be assigned to the buttons.

Figure 7:
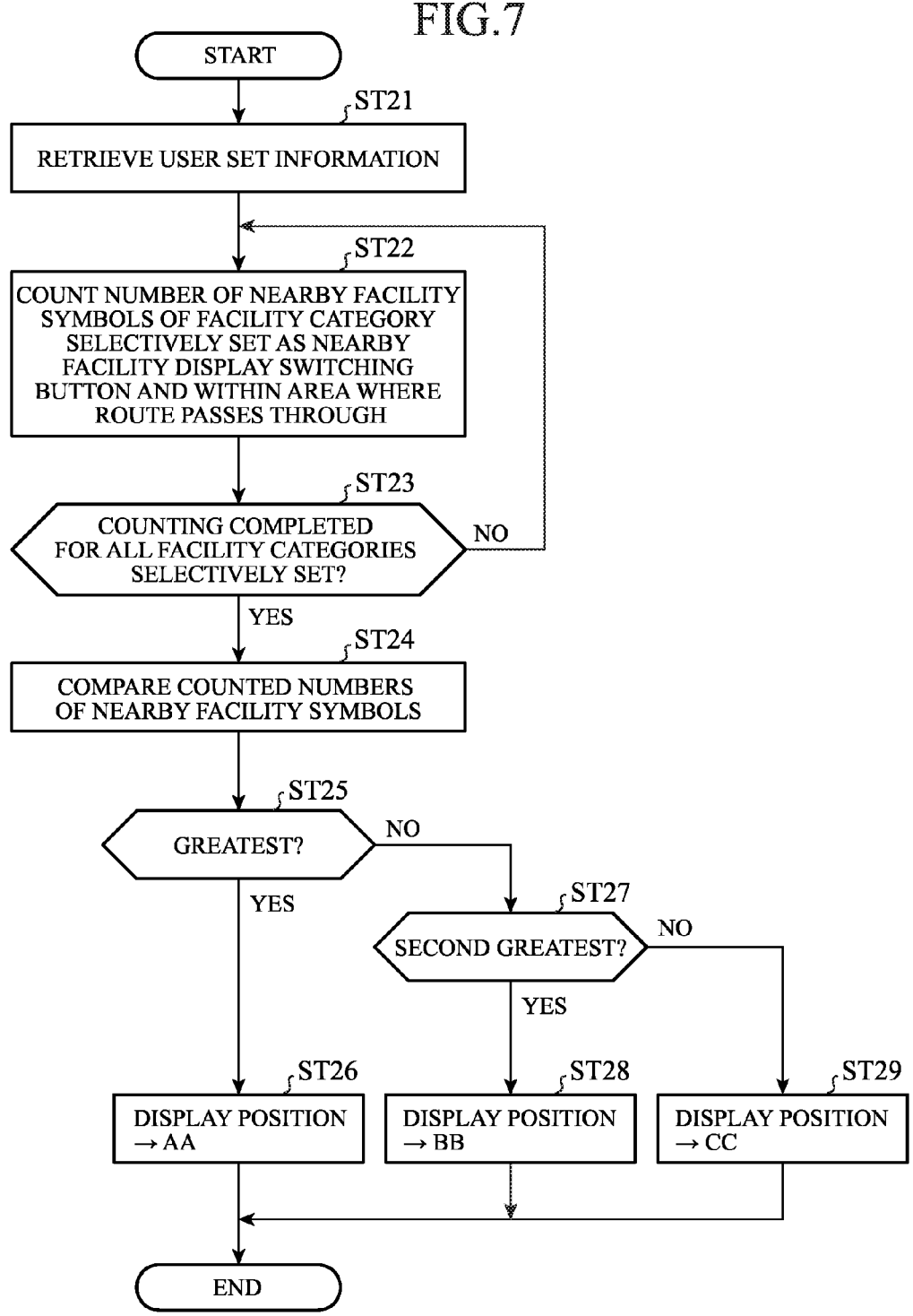
FIG. 7 is a flowchart illustrating operation of a GUI controller of a navigation device according to embodiment 2 of the invention.
Figure 8:
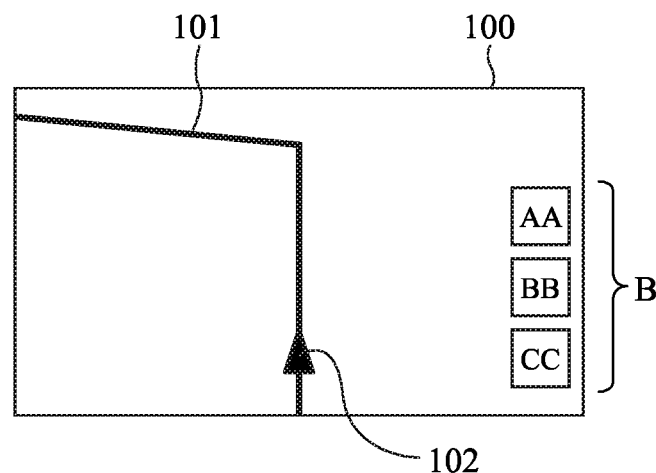
FIG. 8 is a diagram showing an example of a layout of switching buttons for displaying nearby facilities in the navigation device according to embodiment 2.

FIG. 8 shows an example of a screen display. According to the user set information in this example, after the termination of the series of processing steps shown in the flowchart of FIG. 7, three nearby facility display switching buttons B are automatically displayed on the simple map 100. The facility category associated with the greatest number of nearby facility symbols is displayed at the position indicated by "AA", and facility categories associated with smaller number of symbols are displayed below at the positions of "BB" or "CC" in the descending order on the screen. Further, facility categories, which are set by the user as candidates to be displayed, include CVS, GS, banks and the like. In addition to the facility category buttons, buttons for switching display and non-display of map elements such as station name, place name, large building, railway name, road name, and the like may be included in the options.

The GUI controller 13 determines which one out of the user-set facility categories that are display candidates is to be assigned to the button "AA," "BB" or "CC," according to the flowchart of FIG. 7. In this example, as one of the appropriate display determination conditions stored in the appropriate display determination condition storage unit 132, a condition is set that the top three facility categories associated with greater numbers of nearby facility symbols are arranged from an upper part of the screen, which provides easier access for the user, to a lower part in the order of "AA," "BB" and "CC."

In the subsequent step ST22, according to the retrieved user set information, the appropriate display determination unit 131 selects one of the facility categories that are selectively set to the nearby facility display switching buttons as a subject facility category, and extracts facility information on this subject facility category from the map DB 2. The appropriate display determination unit 131 counts the number of nearby facility symbols belonging to the subject facility category within an area where the navigation route 101 passes through. The area passed through by the navigation route 101 may be an area that is displayed within the screen display area and is within a predetermined distance (for example, 1 km) from the navigation route. Alternatively, it may be a parcel where the navigation route passes through. A parcel is a part of a map image.

The appropriate display determination unit 131 repeats the process of counting the number of nearby facility symbols by changing the subject facility category to another facility category that is also selectively set in the user set information ("NO" in step ST23 and "YES" in step ST22). After completing the counting of the number of nearby facility symbols for all facility categories ("YES" in step ST23), the appropriate display determination unit 131 then compares the counted numbers of nearby facility symbols (step ST24).

As a result of the comparison, the appropriate display determination unit 131 determines that a facility category associated with the largest number of nearby facility symbols is to be displayed at the position "AA" ("YES" in step ST25, ST26). The appropriate display determination unit 131 also determines that a facility category associated with the second largest number of nearby facility symbols is displayed at the position "BB" ("NO" in step ST25, "YES" in step ST27, ST28). The appropriate display determination unit 131 also determines that a facility category associated with the smallest number of nearby facility symbols is displayed at the position "CC" ("NO" in step ST25, "NO" in step ST27, ST29).

Upon receiving a result of determination from the appropriate display determination unit 131, the display controller 133 outputs as display information the display positions of "AA," "BB," and "CC" and data for displaying the name or mark of the facility category determined to be displayed at each display position to the image creation unit 16. The image creation unit 16 then uses the display information to superimpose and display the nearby facility display switching buttons B on the simple map 100, for example, as shown in FIG.

2. Not only the names of the facility categories but also the number of nearby facility symbols counted by the appropriate display determination unit 131 may be displayed with the nearby facility display switching buttons. The arrangement of the buttons is not limited to a vertical direction of the screen; the buttons may be arranged in a horizontal direction.

For example, when there are extremely few nearby facility symbols displayed on the simple map, or when there are extremely many nearby facility symbols displayed and information is crowded too much, the user may possibly want to temporarily change the representations in the surrounding area of the navigation route. In this case, since the nearby facility display switching buttons B are arranged on the simple map 100 as shown in FIG. 2, the user can immediately toggle the nearby facility symbols without performing setting operations to change the displayed screen.

Although in the foregoing description, the display switching buttons displayed on the simple map have a function to switch display and non-display of nearby facility symbols for each facility category, the invention is not limited to this, but switching buttons assigned with functions as described below may be displayed according to appropriate display determination conditions.

For example, there may be displayed a display switching button for switching display and non-display of all nearby facility symbols regardless of facility categories, a display switching button for switching display and non-display of roadside facility symbols, a button for changing the display size of facility symbols, a display switching button for switching display and non-display of letter strings representing road names or intersections or of map elements other than the facility symbols, such as congested lanes or the like.

The navigation device may be configured such that these buttons are displayed based on a determination that the map screen will be crowded when the amount of information on the simple map exceeds a predetermined threshold, or on a determination that road conditions near the navigation route are important, whereby the map is made easier to view.

The road conditions near the navigation route may be important, for example, when the object of interest is difficult to visibly recognize in a place where multitenant buildings or the like are densely populated and thus road names intersecting with the route and/or intersections lying on the route are considered to be more effective as object of interest than the roadside facility symbols. Determinations of whether multitenant buildings are populated densely and whether a shop or office selected as a facility symbol and displayed as an object of interest is a tenant of a building (this constitutes a base to determine whether or not the building is a multitenant building) may be made by the appropriate display determination unit 131 based on information acquired from both the map DB 2 and the navigation data management unit 11.

Also, for example, when traffic congestion has occurred on the navigation route or around the navigation route, that is, when the user needs to be informed of a surrounding traffic congestion state rather than roadside facility symbols as the object of interest, the road conditions around the navigation route may be important. The appropriate display determination unit 131 may determine whether or not traffic congestion has occurred based on congestion information received from an external server 8 (such as VICS (Vehicle Information and Communication System) center) and coordinate information of the route in the navigation data management unit 11.

Figure 9:
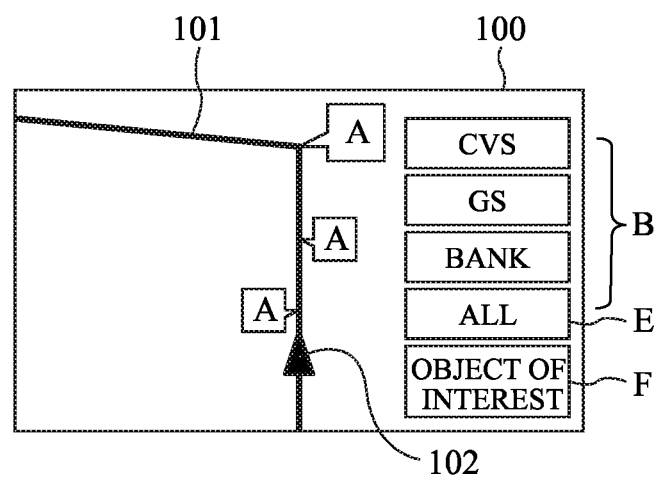
FIG. 9 is a diagram showing an example of a display screen of the navigation device according to embodiment 2.

In an example of a display screen shown in FIG. 9, in addition to the nearby facility display switching buttons B for the facility categories of "CVS", "GS", and "banks", there are displayed a nearby facility display switching button E of "ALL" for switching display and non-display of all the nearby facility symbols and a switching button F of "OBJECT OF INTEREST" for switching display and non-display of the roadside facility symbols.

However, in order to ensure usability of the map, it is desirable to keep the roadside facility symbols displayed. Therefore, it is preferable that even if the "OBJECT OF INTEREST" display switching button F is pressed (touched), non-display of the roadside facility symbols is terminated after a period of time elapses. That is, the display controller 133 makes the roadside facility symbol non-displayed if the "OBJECT OF INTEREST" display switching button F is pressed (touched), and makes it displayed again after a period of time elapses.

Although, in the flowchart of FIG. 7, an appropriate display determination condition is set such that a facility categories associated with a greater number of nearby facility symbols is given higher priority, the condition is not limited to this case.

For example, the appropriate display determination condition may be set such that the number of user selections of each facility category is acquired and a facility category that is selected more frequently is given a higher priority. In this case, the operation history storage unit 151 acquires user operation history from the input unit 3, and stores the number of times the nearby facility display switching button (facility category) is pressed, destinations, names of nearby facilities to be used for searching the nearby facilities and the like. The condition updating unit 15 then refers to the history information in the operation history storage unit 151 to retrieve the number of times the user has selected for each of the facility categories and increase the priority of a facility category that is selected by the user more frequently is made higher. This makes it possible to display a nearby facility display switching button for a facility category which the user frequently causes to display at a position on the simple map easy to press, and thus the arrangement of the buttons can be generated automatically in the user's favorite state. Specifically, for example, when a user who often causes nearby facility symbols CVS to be displayed feels that the screen is crowded if the symbols of CVS are kept displayed, the user may press the nearby facility display switching button for CVS displayed on the simple map to switch it to non-display temporarily, and thus the user is allowed to perform operation easily to make the display on the screen simple.

Further, priorities of the facility categories may be determined based on real-time information that can be acquired from the vehicle information acquisition unit 7 and the external server 8.

Specifically, for example, the GUI controller 13 acquires a gasoline remaining amount by means of the vehicle information acquisition unit 7, and if the gasoline remaining amount is equal to or less than a predetermined threshold, the appropriate display determination condition storage unit 132 changes the appropriate display determination conditions to increase the priority of the facility category "GS". This makes it possible to display the nearby facility display switching button for GS at a position easy to press when the gasoline remaining amount is small.

Where the navigation device is mounted on an electric vehicle, the GUI controller 13 acquires a remaining amount of an on-vehicle battery by means of the vehicle information acquisition unit 7 so that the priority of the facility category of charging stations is increased.

Further, for example, the GUI controller 13 may acquire congestion information indicating a degree of traffic congestion in a surrounding area of the current position through communication with the external server 8, and the appropriate display determination condition storage unit 132 may change the appropriate display determination conditions so that the priority of a function to display the congestion information is increased. This makes it possible to display the display switching button for displaying the congestion information at a position on the screen easy to press when surrounding roads are congested.

Alternatively, if the gasoline remaining amount is equal to or less than the threshold or the congestion information is acquired, a corresponding display switching button may be displayed. This makes it possible to display the display switching buttons on the simple map only when they are necessary for the user and not displayed when they are not necessary in order to prioritize the visibility of the map.

Although, in the flowchart of FIG. 7, a series of processing steps are started at the time when a navigation route is set and nearby facility display switching buttons are displayed, the timing to display the switching buttons is not limited to this. For example, the GUI controller 13 may be configured to acquire vehicle speed information via the vehicle information acquisition unit 7 and start the above-described processing when the vehicle is halted (or travelling at less than a predetermined speed) so that the nearby facility display switching buttons are displayed, whereas the nearby facility display switching buttons are made non-displayed while the vehicle is traveling (or travelling at the predetermined speed or more).

Further, for example, the flowchart shown in FIG. 7 may be executed at a predetermined timing, such as every time when a certain period of time elapses or when a user set value is changed, to update the display of the buttons.

Further, for example, when the setting is such that the nearby facility display switching buttons are not displayed normally on the simple map, the flowchart of FIG. 7 maybe executed by being triggered by the user operation to display the nearby facility display switching buttons. For example, when the user touches the touch display, this operation is received by the input unit 3 and output to the GUI controller 13. Alternatively, a menu button may be displayed on the simple map, and pressing (touching) the menu button by the user is received by the input unit 3 and is output to the GUI controller 13. This menu button may be created by the GUI controller 13 and output to the image creation unit 16.

The display controller 133 may be configured to make the display switching buttons for nearby facility symbols displayed on the simple map not to be displayed after a predetermined time elapses.

According to Embodiment 2 as described above, the GUI controller 13 counts, for each category, the nearby facility symbols that is located within a predetermined map range including the navigation route, and arranges the nearby facility display switching buttons in the order of count from a facility category with the highest count. This configuration allows the user to determine easily, before pressing (touching) a nearby facility display switching button, whether the map screen is likely to be crowded by pressing (touching) the button concerned. Therefore, the amount of information displayed on the map may be changed easily to be optimal for the user, and a map with high visibility can be provided.

The GUI controller 13 according to Embodiment 2 comprises an appropriate display determination condition storage unit 132 for storing information on priorities according to the categories of the facilities, and is configured to arrange the nearby facility display switching buttons in the order of priorities from a facility category with the highest priority. Therefore, the user may set the priorities in advance for the content to be displayed on the map in an optimal state for the user.

The navigation device according to Embodiment 2 comprises an operation history storage unit 151 for storing history information of operations performed by the user, and a condition updating unit 15 for updating the priorities stored in the appropriate display determination condition storage unit 132 based on the history information stored in the condition updating unit 15 such that a facility category which is operated more frequently is given a higher priority. In addition, the GUI controller 13 is configured to determine an arrangement of the nearby facility display switching buttons by using the information on priorities updated by the condition updating unit 15. Therefore, it is possible to arrange the displayed buttons in a state desired by the user and to improve the operability.

Further, the GUI controller 13 according to Embodiment 2 is configured to determine the arrangement of the nearby facility display switching buttons based on information on priorities acquired through communications from the external server 8 or the vehicle information acquisition unit 7, or based on information on priorities set with use of the acquired information. This makes it possible to change the arrangement of the buttons based on real-time information.

Embodiment 3

In Embodiment 1 described above, when a nearby facility display switching button is pressed (touched) by the user, nearby facility symbols of the facility category corresponding to the pressed (touched) button are displayed on the simple map. However, when no facilities of this category are located near the current position, no nearby facility symbols will be displayed even though the button is pressed (touched). Therefore, the navigation device according to Embodiment 3 is configured to notify the user of the reason why the nearby facility symbols are not displayed in spite of the button being pressed (touched) by displaying a telop to that effect.

Since the navigation device according to Embodiment 3 is of the same configuration as that of the navigation device shown in FIG. 1 as long as viewed in the figures. Therefore, the navigation device according to Embodiment 3 will be described with aid of FIG. 1.

Figure 10:
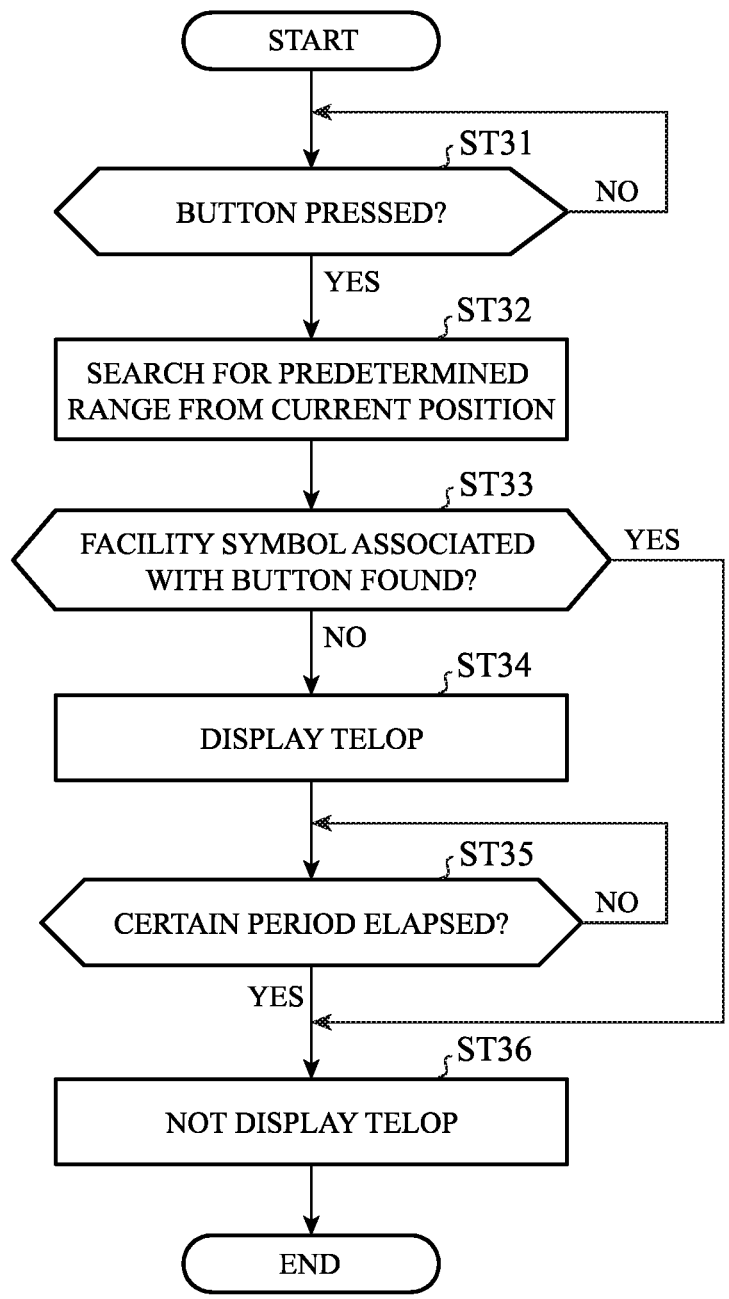
FIG. 10 is a flowchart showing operation of a map element display controller of a navigation device according to embodiment 3 of the invention.

The operations of the map element display controller 14 will be described with reference to the flowchart shown in FIG. 10. It is assumed here that there are displayed, on the simple map 100 for navigating a navigation route 101, nearby facility display switching buttons B for switching the display of the nearby facility symbols located within the range of the display screen. Further, it is assumed that the nearby facility display switching button B for the facility category of "CVS" is pressed (touched) and that the nearby facility symbols C of CVS corresponding to this button are displayed.

When the user presses (touches) the nearby facility display switching button B for the facility category of "GS" displayed on the touch display of the display unit 6, pressing (touching) this button is received by the input unit 3 and outputted to the GUI controller 13. Subsequently, the GUI controller 13 outputs the information that the nearby facility display switching button for GS is pressed (touched) to the map element display controller 14.

If the map element display controller 14 receives the information from the GUI controller 13 that the nearby facility display switching button for the facility category "GS" is pressed (touched) in step ST 31 ("YES" in step ST31), in the subsequent step ST32 the display mode determination unit 141 refers to the map DB 2 to search for facility information for the facility category "GS" located within a predetermined range (at least within a screen display area) along the navigation route 101 from the current position corresponding to a host vehicle position 102.

If there is no facility information as a result of the search ("NO" in step ST33), the display mode determination unit 141 gives a notification to the display controller 143 that a telop should be displayed. In the subsequent step ST34, the display controller 143 that has received the notification outputs display information for displaying a telop message that "there is no gas stations within a range of xx meters from the current position," or that "there is no gas stations around the route for a while ahead" to the image creation unit 16, and the image creation unit 16 uses the display information to superimpose the telop on the simple map 100.

Figure 11:
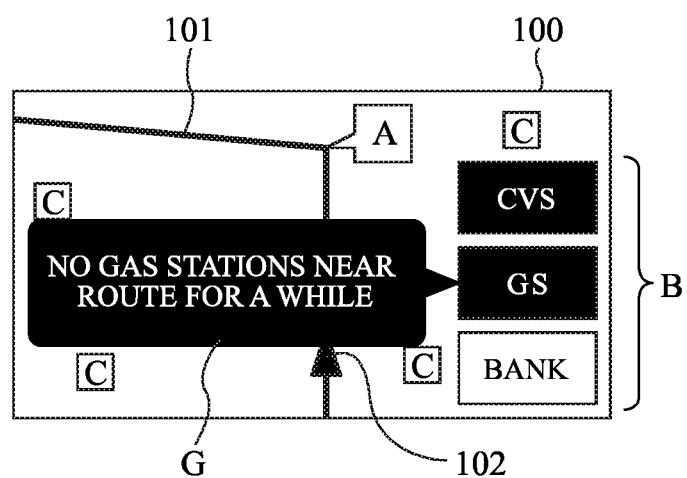
FIG. 11 is a diagram showing an example of the navigation device according to embodiment 3.

FIG. 11 shows an example of the screen on which the telop G is displayed. This exemplary screen allows the user to know easily the reason why no nearby facility symbol is displayed when the nearby facility display switching button B is pressed (touched) (i.e., the symbol is not displayed for ensuring the simplicity of the map or the facility really does not exist) at the time when pressing (touching) the button.

It should be understood that the size and display position of the telop G are not limited to those shown in this example, as a matter of course.

If a certain period has elapsed after displaying the telop ("YES" in step ST35), the display controller 143 stops outputting the display information to the image creation unit 16 and turns off the display of the telop (step ST36).

On the other hand, if there is information on one or more facilities as a result of the search ("YES" in step ST33), the display mode determination unit 141 notifies the display controller 143 not to display the telop. In the subsequent step ST36, the notified display controller 143 terminates the processing shown in FIG. 10 without performing any further processing.

In this case ("YES" in step ST33), the map element display controller 14 subsequently performs the processing steps of the flowchart shown in FIG. 4 (steps ST2 to ST13) described in accordance with Embodiment 1.

These processing steps are performed every time the image creation unit 16 updates an image to be drawn.

In step ST34, not only the telop G as shown in FIG. 11 is displayed, but also displays as follows are possible.

For example, in step ST34, the display mode determination unit 141 retrieves from the map DB 2 information on a facility of a facility category corresponding to the pressed (touched) button, which is located the nearest outside the predetermined range that is searched in step ST32, and notifies the display controller 143 of the information. The display controller 143 then displays a location of this nearest facility information in place of or in addition to the telop. The location of the facility information may be displayed in a half-screen map separated from the simple map or the address of that location may be displayed in a character string.

Further, it is also possible to configure such that the display mode determination unit 141 acquires the nearest facility information and gives an instruction to the GUI controller 13 so that a button is displayed for causing the location of the location of the nearest facility information to be displayed.

According to Embodiment 3 as described above, when there are no nearby facility symbols of the facility category corresponding to the nearby facility display switching button on which the user operation is received by the input unit 3 within a predetermined map range including the navigation route, the display mode determination unit 141 outputs, through the display unit 6, a notification that the nearby facility symbols of that category are not displayed. This configuration allows the user to know easily the reason why no nearby facility symbol is displayed when the nearby facility display switching button is pressed (touched) at the time when pressing (touching) the button.

It should be noted that various combinations of the embodiments, modifications of any components or elements, and omissions of optional elements in the embodiments may be made within the scope of the present invention.

Industrial Applicability

As described above, the navigation device according to the invention, which is configured to display object of interest along the route more prominently, is suitable for use as a navigation device mounted on a vehicle, or carried in into a vehicle. Further, the navigation device is applicable as a navigation device for mobile bodies including, not only vehicles, but also humans, trains, vessels and aircrafts.

REFERENCE SIGNS LIST

1: simple map creation device
2: map DB
3: input unit
4: host vehicle position determination unit
5: route calculation unit
6: display unit
7: vehicle information acquisition unit
8: external server
11: navigation data management unit
12: simple map creation unit
13: GUI controller
14: map element display controller
15: condition updating unit
16: image creation unit
100: simple map
101: navigation route
102: host vehicle position
131: appropriate display determination unit
132: appropriate display determination condition storage unit
133: display controller
141: display mode determination unit
142: display mode determination condition storage unit
143: display controller
151: operation history storage unit

The invention claimed is:

1. A navigation device comprising:
a map creation unit configured to create a map to be displayed based on map data containing position information of roads, position information of facilities and categories of the facilities, and based on information on a navigation route to a destination;
a display unit configured to display, on the created map, roadside target facility symbols representing facilities as navigation targets that are located along the navigation route, on-map facility symbols representing facilities that differ from the facilities as the navigation targets on the created map, and facility display switching buttons for receiving operation of switching display/non-display of the on-map facility symbols by facility category; and
a map element display controller configured to switch the display/non-display of the on-map facility symbols in accordance with the operation received through the facility display button, and, when the received operation indicates the display of the on-map facility symbols, control the display unit to display the on-map facility symbols in a different display mode from a display mode of the roadside target facility symbols.

2. The navigation device according to claim 1, wherein the map element display controller differentiates a display size of the roadside target facility symbols from a display size of the on-map facility symbols.

3. The navigation device according to claim 1, wherein the map element display controller comprises information on priorities according to the facility categories and, when it is determined that the on-map facility symbols overlap with each other on the map, determines that an on-map facility symbol having a higher priority is displayed preferentially based on the categories of facilities corresponding to the overlapped on-map facility symbols.

4. The navigation device according to claim 3, further comprising:
   an operation history storage unit configured to store history information on operations performed by the user; and
   a condition updating unit configured to update the priorities based on the history information in the operation history storage unit such that a facility category for which operations are performed more frequently is given a higher priority,
   wherein the map element display controller controls the display unit, by using information on the updated priorities, to preferentially display the on-map facility symbol having a higher priority in the on-map facility symbols overlapped with each other.

5. The navigation device according to claim 1, further comprising a GUI controller configured to count, for each facility category, the on-map facility symbols that are located within a predetermined map range including the navigation route, and arrange the facility display switching buttons in the order of count from a facility category with the highest count.

6. The navigation device according to claim 1, further comprising a GUI controller comprising information on priorities according to the facility categories, and arranging the facility display switching buttons in the order of priorities from a facility category with the highest priority.

7. The navigation device according to claim 6, further comprising:
   an operation history storage unit configured to store history information on operations performed by the user; and
   a condition updating unit configured to update the priorities based on the history information in the operation history storage unit such that a facility category for which operations are performed more frequently is given a higher priority,
   wherein the GUI controller uses information on the priorities updated by the condition updating unit to determine an arrangement of the facility display switching buttons.

8. The navigation device according to claim 6, wherein the GUI controller determines an arrangement of the facility display switching buttons, based on information on priorities acquired from the outside via communications or on information on priorities set with use of information acquired from the outside via communications.

9. The navigation device according to claim 1, wherein when no on-map facility symbols of a facility category corresponding to the operation received through the facility display switching button are located in a predetermined map range including the navigation route, the map element display controller outputs through the display unit a notification indicating that no on-map facility symbols of the facility category concerned are displayed.

10. The navigation device according to claim 1, wherein, when the received operation indicates the non-display of the on-map facility symbols, the map element display controller controls the display unit not to display the on-map display facility symbols while displaying the roadside target facility symbols.

\* \* \* \* \*